(12) United States Patent
Ikeno et al.

(10) Patent No.: US 9,417,008 B2
(45) Date of Patent: Aug. 16, 2016

(54) PRODUCTION METHOD AND PRODUCTION SYSTEM FOR NATURAL GAS

(71) Applicant: Japan Petroleum Exploration Co., Ltd., Tokyo (JP)

(72) Inventors: Tomonori Ikeno, Ichikawa (JP); Kazumoto Chiba, Ichihara (JP); Toshiya Wakatsuki, Funabashi (JP); Yusuke Takeuchi, Akita (JP); Kazutoshi Chaki, Ichihara (JP); Junichiro Ando, Kitamoto (JP)

(73) Assignee: Japan Petroleum Exploration Co., Ltd., Tokyo (JP)

( * ) Notice: Subject to any disclaimer, the term of this patent is extended or adjusted under 35 U.S.C. 154(b) by 0 days.

(21) Appl. No.: 14/400,848

(22) PCT Filed: May 16, 2013

(86) PCT No.: PCT/JP2013/063678
§ 371 (c)(1),
(2) Date: Nov. 13, 2014

(87) PCT Pub. No.: WO2013/172416
PCT Pub. Date: Nov. 21, 2013

(65) Prior Publication Data
US 2015/0121952 A1    May 7, 2015

Related U.S. Application Data

(63) Continuation-in-part of application No. PCT/JP2012/062497, filed on May 16, 2012.

(51) Int. Cl.
*B01D 53/22* (2006.01)
*F25J 1/02* (2006.01)
(Continued)

(52) U.S. Cl.
CPC . *F25J 1/02* (2013.01); *B01D 53/22* (2013.01); *C01B 23/0042* (2013.01); *C10L 3/101* (2013.01);
(Continued)

(58) Field of Classification Search
CPC ...... B01D 53/22; B01D 71/02; B01D 71/024; B01D 71/027; B01D 71/028; B01D 2256/18; B01D 2256/245; B01D 2257/11; C10L 3/10; C10L 3/101; C10L 2290/06; C10L 2290/46; C10L 2290/48; C10L 2290/548; C01B 23/0042; C01B 23/0047; E21B 43/40; F25J 1/02
USPC .......................................................... 95/53
See application file for complete search history.

(56) References Cited

U.S. PATENT DOCUMENTS 4,321,790 A    3/1982  Vadas et al.
5,035,727 A *  7/1991  Chen ...................... B01D 53/22
                                                         205/634
(Continued)

FOREIGN PATENT DOCUMENTS

CN    1118060 A    3/1996
EP    0945163 A1   9/1999
(Continued)

OTHER PUBLICATIONS

Khan, S.A. et al., "Experience, problems and perspectives for gaseous helium storage in salt caverns on the territory of Russia", 24th World Gas Conference, WOC-2 STORAGE, International Gas Union, 2009, pp. 1-9.*

(Continued)

*Primary Examiner* — Jason M Greene
(74) *Attorney, Agent, or Firm* — Panitch Schwarze Belisario & Nadel LLP

(57) ABSTRACT

A production method for natural gas according to the invention includes a step of adiabatically compressing a raw natural gas containing helium gas, a step of separating the helium gas from the raw natural gas by passing the adiabatically-compressed raw natural gas through a separation membrane unit, a step of conveying the raw natural gas from which the helium gas has been separated to a terminal through a pipe line, and a step of pressing the helium gas separated from the raw natural gas into an underground storage formation.

14 Claims, 5 Drawing Sheets

(51) Int. Cl.
*C01B 23/00* (2006.01)
*E21B 43/40* (2006.01)
*C10L 3/10* (2006.01)

(52) U.S. Cl.
CPC ............ *E21B 43/40* (2013.01); *B01D 2256/18* (2013.01); *B01D 2256/245* (2013.01); *B01D 2257/11* (2013.01); *C01B 2210/0031* (2013.01); *C10L 2290/06* (2013.01); *C10L 2290/46* (2013.01); *C10L 2290/48* (2013.01); *C10L 2290/548* (2013.01)

(56) References Cited

U.S. PATENT DOCUMENTS

| | | | | |
|---|---|---|---|---|
| 5,064,446 | A * | 11/1991 | Kusuki | C01B 23/0047 95/53 |
| 5,632,803 | A * | 5/1997 | Stoner | B01D 53/229 95/53 |
| 6,179,900 | B1 * | 1/2001 | Behling | B01D 53/04 95/53 |
| 2004/0038044 | A1 * | 2/2004 | Ruldolph | B01D 71/027 428/446 |
| 2004/0206242 | A1 * | 10/2004 | Wijmans | B01D 53/263 96/234 |
| 2004/0255618 | A1 | 12/2004 | Pelle et al. | |
| 2005/0063830 | A1 | 3/2005 | Mennie et al. | |
| 2005/0217479 | A1 * | 10/2005 | Hale | C01B 23/0042 95/53 |
| 2011/0197762 | A1 * | 8/2011 | Voss | B01D 71/028 95/45 |
| 2014/0345457 | A1 * | 11/2014 | Balster | B01D 53/225 95/53 |

FOREIGN PATENT DOCUMENTS

| | | |
|---|---|---|
| JP | S55-60614 A | 5/1980 |
| JP | H02-503522 A | 10/1990 |
| JP | H08-38846 A | 2/1996 |
| JP | 2003-192315 A | 7/2003 |
| JP | 2003-342009 A | 12/2003 |
| JP | 2004-514546 A | 5/2004 |
| JP | 2005-509831 A | 4/2005 |
| JP | 2005-147111 A | 6/2005 |
| JP | 2005-305425 A | 11/2005 |
| JP | 2006-503252 A | 1/2006 |
| JP | 2009-542881 A | 12/2009 |
| WO | 8908462 A1 | 9/1989 |
| WO | 2004033975 A2 | 4/2004 |
| WO | 2008006788 A2 | 1/2008 |

OTHER PUBLICATIONS

Tsybulskiy et al, "Experience, problems and perspectives for gaseous helium storage in salt caverns on the territory of Russia," 24th World Gas Conference, WOC 2-STORAGE, International Gas Union, pp. 1-9 (Oct. 5, 2009).

Int'l Search Report issued Aug. 20, 2013 in Int'l Application No. PCT/JP2013/063678.

Int'l Search Report issued Aug. 21, 2012 in Int'l Application No. PCT/JP2012/062497.

Extended European Search Report issued Jan. 20, 2016 in EP Application No. 13790463.7.

Search Report issued May 19, 2016 in CN Application No. 201380025021.2.

* cited by examiner

PRODUCTION METHOD AND PRODUCTION SYSTEM FOR NATURAL GAS

CROSS-REFERENCE TO RELATED APPLICATION

This application is a Section 371 of International Application No. PCT/JP2013/063678, filed May 16, 2013, which was published in the Japanese language on Nov. 21, 2013, under International Publication No. WO 2013/172416 A1, and International Application No. PCT/JP2012/062497, filed May 16, 2012, which was published in the Japanese language on Nov. 21, 2013, under International Publication No. WO 2103/171856 A1, and the disclosures of both of which are incorporated herein by reference.

Priority is claimed on PCT International Application No. PCT/JP2012/062497, filed May 16, 2012, the amount of which is incorporated herein by reference.

TECHNICAL FIELD

The present invention relates to a production method and a production system for natural gas which are intended to produce a natural gas product from a raw natural gas.

BACKGROUND ART

In some cases, a raw natural gas obtained by mining a gas field or the like contains helium gas in addition to oil, hydrocarbons of condensates and the like, and impurities such as water and nitrogen. When a commercial-use natural gas product is produced, there is a case in which a treatment is carried out to remove not only the above-described hydrocarbons and impurities but also the helium gas from the raw natural gas.

As means for separating the helium gas from the raw natural gas, according to a rough classification, the methods, a cryogenic distillation process, an adsorption/absorption process, and a membrane separation process have been already known. The cryogenic distillation process is a separation method by distillation using the difference of the boiling point of gas. In the cryogenic distillation process, a raw natural gas containing helium gas is adiabatically expanded so as to be cooled, and mainly, components other than helium are liquefied, thereby separating the helium gas (for example, refer to PTL 1).

The adsorption/absorption process is a method in which a raw natural gas is brought into contact with a predetermined adsorbent or absorbent so as to adsorb or absorb only helium gas to the adsorbent or absorbent, and helium gas is desorbed from the adsorbent or absorbent using the temperature difference or the pressure difference. In addition, in the adsorption/absorption process, components other than helium are adsorbed by the adsorbent or absorbent so as to increase the concentration of helium, thereby separating the helium gas (for example, refer to PTL 2).

The membrane separation process is a separation method in which, for example, a membrane that selectively separates molecules or atoms according to the sizes or properties thereof is used, and a phenomenon in which mainly helium gas penetrates the membrane when a raw natural gas is brought into contact with a single side of the membrane, and a relatively less pressure than that on the single side is formed on the other side is used, that is, the difference in the membrane penetration rate among components in the raw natural gas is used (for example, refer to PTL 3).

Impurities including helium gas are removed from the raw natural gas at a terminal that is connected with a gas field through a pipe line. The amount of the helium gas significantly varies depending on the production area of natural gas, and raw natural gas produced from several production areas in the world contain an extremely larger amount of helium gas than those from other production areas. When the helium gas is separated from the raw natural gas containing a large amount of helium gas as described above, there is a case in which the treatment of the helium gas obtained through separation poses an issue. That is, the laws and regulations of some natural gas-producing countries prohibit the diffusion of the helium gas separated from the raw natural gas in the atmosphere, and in some cases, request the collection of a predetermined portion or more of helium gas.

Helium has been used in the ultralow-temperature cooling of a superconductor, an MRI in a medical field, and the like, and has been positioned as a valuable natural resource, but the consumption amount thereof is not that great, and therefore the easy supply of helium to the market does not guarantee a commercial success.

When a commercial success is not expectable, and the supply to the market is not possible, it becomes necessary to treat the collected helium gas by any means. For example, when excessive helium gas is stored by constructing a storage facility in the terminal, not only the construction cost of the facility but also the maintenance cost of the facility become necessary, and thus considerable efforts and costs are taken to store the helium gas that has no expectation of shipment as a product. Therefore, in production areas of natural gas containing a large amount of helium gas, natural gas has not been actively produced.

CITATION LIST

Patent Literature

[PTL 1] Japanese Unexamined Patent Application, First Publication No. 2005-509831

[PTL 2] Published Japanese Translation No. H2-503522 of the PCT International Publication

[PTL 3] Japanese Unexamined Patent Application, First Publication No. 2003-342009

SUMMARY OF INVENTION

Problem to be Solved by the Invention

However, the need for a fossil fuel as energy for power generation has been increasing once again due to the recent concern over atomic power generation, and even in a production area of natural gas containing a large amount of helium gas, the commercial production of natural gas has been comprehensively promoted.

As a method for treating excessive helium gas, a method in which the helium gas is injected to an underground storage formation can be considered. According to this method, it is possible to treat the helium gas without constructing a storage facility. However, since the presence of a storage formation allowing the injection of the helium gas to the underground of the terminal is not guaranteed, when this method is employed, the helium gas is removed from the raw natural gas preferably near a production well from which the raw natural gas has been mined. This is because, in the underground of a gas field from which natural gas is produced, there is a high possibility of the presence of a storage formation allowing the helium gas to be pressed into the underground.

The invention has been made on the basis of the above-described finding, and an object of the invention is to enable the production of a natural gas product without investing considerable effort and costs in the treatment of helium gas obtained in the process of producing natural gas.

Means for Solving the Problem

A production method for natural gas according to an embodiment of the invention includes a step of adiabatically compressing a raw natural gas containing helium gas, a step of separating the helium gas from the raw natural gas by passing the adiabatically-compressed raw natural gas through a separation membrane unit, a step of conveying the raw natural gas from which the helium gas has been separated to a terminal through a pipe line, and an injection step of the helium gas separated from the raw natural gas to an underground storage formation.

In the past, a raw natural gas was pressurized at a gas field after being mined, and was conveyed to a terminal at a distant place using the pressure difference between a pipe line inlet on a gas field side and a pipe line outlet on a terminal side.

In the invention, with attention paid to what has been described above, a raw natural gas is pressurized, that is, adiabatically-compressed, so as to be increased in temperature, and then is passed through the separation membrane unit, and helium gas is thereby separated from the raw natural gas. The helium gas separated from the raw natural gas is returned to the underground near the gas field by the injection of the helium gas to the storage formation. Meanwhile, the raw natural gas from which the helium gas has been separated is conveyed to a terminal at a distant place using the pressure difference in the same manner as in the related art after the passage through the separation membrane unit.

According to the invention, since the raw natural gas having a pressure and a temperature increased by adiabatic compression is passed through the separation membrane unit, and then the helium gas is separated from the raw natural gas using the difference in pressure before and after the separation membrane with attention paid to the pressurization of the raw natural gas which was carried out in the related art for the purpose of the long-distance transportation of natural gas, the facility for separating the helium gas is lower in cost than the other facility in which the cryogenic distillation process or the adsorption/absorption process is employed. Furthermore, the separation membrane made of an inorganic porous material has excellent separation performance against the helium gas heated to a certain extent, and therefore the heating of the raw natural gas through the adiabatic compression is also effective in terms of this fact. In addition, since the helium gas separated from the raw natural gas is returned to the underground near the gas field by the injection of the helium to the storage formation, it is not required to construct a new extra storage facility.

In the production method for natural gas according to the embodiment of the invention, a separation membrane included in the separation membrane unit may be made of an inorganic porous material having multiple fine pores.

According to this method, it is possible to realize the efficient separation of the helium gas using a simple configuration.

In the production method for natural gas according to the embodiment of the invention, the fine pores in the separation membrane may have a diameter in a range of 0.26 nm to less than 0.43 nm. Meanwhile, the diameter of the fine pores in the invention refers to the average value of the diameters of the multiple fine pores.

According to this method, the diameter of the fine pores in the separation membrane is set to a size of 0.26 nm or more that is the molecular Kinetic diameter of a helium molecule, that is, a diameter obtained in consideration of the molecular motion. Therefore, when the raw natural gas is supplied to one surface side of the separation membrane, helium molecules contained in the raw natural gas pass through the fine pores in the separation membrane, and move toward the other surface side of the separation membrane. Then, it is possible to separate the helium gas from the raw natural gas. In addition, the diameter of the fine pores in the separation membrane is set to a size of less than 0.43 nm. Then, among substances other than the helium gas contained in the raw natural gas, side-chain hydrocarbons such as propane and aromatic hydrocarbons such as toluene are not capable of passing through the fine pores and being separated, and therefore it is possible to maintain the separation efficiency of the separation membrane at a high level.

In the production method for natural gas according to the embodiment of the invention, the step of adiabatically compressing the raw natural gas may be carried out using a compressor, and the compressor may send, using pressure, the raw natural gas through a pipe line extending from the separation membrane unit toward a downstream side of the pipe line.

According to this method, a single compressor is used for both the adiabatic compression of the raw natural gas and the sending of the raw natural gas using pressure, and therefore, compared with a case in which compressors having individual operations are separately installed, it is possible to decrease the costs of material and the size of a system.

In the production method for natural gas according to the embodiment of the invention, a pressure of the raw natural gas supplied to the separation membrane unit may be greater than 0.1 MPa and less than 12 MPa.

According to this method, since the pressure of the raw natural gas is set to be greater than 0.1 MPa, it is possible to prevent the permeation of the helium gas through the separation membrane from becoming difficult due to the partial pressure of the helium gas becoming too low. Then, the reliable separation of the helium gas becomes possible. The pressure of the raw natural gas is also set to be less than 12 MPa. This is because, when the pressure of the raw natural gas is greater than 12 MPa, it becomes necessary to increase the mechanical strength by increasing the wall-thickness of the separation film, to withstand the pressure difference on both sides of the separation membrane, but an increase in the wall-thickness of the separation membrane, accordingly, decreases the permeate rate or permeation amount of the helium gas, and thus the separation capability of the separation membrane degrades. In addition, since the generally acceptable maximum pressure in the pipe line of the natural gas is in a range of 10 MPa to 12 MPa, there is no case in which the pressure of the raw natural gas exceeds 12 MPa.

In the production method for natural gas according to the embodiment of the invention, the separation amount of the helium gas may be controlled by adjusting the temperature of the raw natural gas supplied to the separation membrane unit.

According to this method, it is possible to more accurately and more rapidly control the separation amount of the helium gas compared with a case in which the separation amount of the helium gas is controlled by opening and closing a valve provided in the pipe line.

In the production method for natural gas according to the embodiment of the invention, exhaust heat from an incidental facility may be used to heat the raw natural gas supplied to the separation membrane unit.

According to this method, it is possible to increase the energy efficiency throughout the entire system by heating the raw natural gas using the exhaust heat from an incidental facility.

In the production method for natural gas according to the embodiment of the invention, the incidental facility may be a gas turbine configured to drive the compressor.

According to this method, it is possible to effectively use the exhaust heat from the gas turbine.

In the production method for natural gas according to the embodiment of the invention, a temperature of the raw natural gas supplied to the separation membrane may be less than 450° C.

According to this method, it is possible to maintain the separation capability of the separation membrane at a high level. This is because, when the temperature of the raw natural gas exceeds 450° C., methane, nitrogen, carbon dioxide, and the like which are components other than helium are activated and diffused, the permeate rate or permeation amount of these substances increases, and thus the helium gas separation efficiency decreases. In addition, according to this method, it is possible to extend the service life of the facility such as the pipe line. This is because, when the temperature of the raw natural gas exceeds 500° C., there is a concern of the facility such as the pipe line being corroded due to the carburization of heavy hydrocarbon which is a component, and therefore the raw natural gas does not become hotter than 500° C.

The production method for natural gas according to the embodiment of the invention may further include a step of sweeping the separation membrane unit.

According to this method, since the helium gas separated from the raw natural gas is swept from the separation membrane unit by the introduced sweeping gas, and there is no helium gas remaining in the separation membrane unit, the helium separation action of the separation membrane unit improves. Therefore, it is possible to efficiently separate the helium gas from the raw natural gas and thus produce a natural gas product.

In the production method for natural gas according to the embodiment of the invention, the separation membrane unit may be swept by introducing a part of the raw natural gas.

According to this method, since it is not necessary to supply another gas separately from the raw natural gas to sweep the separation membrane unit, it is possible to decrease the costs and simplify the system.

A production system for natural gas according to the embodiment of the invention may include a compressor configured to adiabatically compress a raw natural gas containing helium gas, a separation membrane unit configured to separate the helium gas from the adiabatically-compressed raw natural gas, a pipe line configured to convey the raw natural gas from which the helium gas has been separated toward a terminal, and an underground storage facility configured to inject the separated helium gas to an underground storage formation.

According to this system, since the raw natural gas having a pressure and a temperature increased by adiabatic compression is passed through the separation membrane unit, and then the helium gas is separated from the raw natural gas using the difference in pressure before and after the separation membrane with attention paid to the pressurization of the raw natural gas which was carried out in the related art for the purpose of the long-distance transportation of natural gas, the facility for separating the helium gas is lower in cost than the other facility in which the cryogenic distillation process or the adsorption/absorption process is employed. Furthermore, the separation membrane made of an inorganic porous material has excellent separation performance against the helium gas heated to a certain extent, and therefore the heating of the raw natural gas through the adiabatic compression is also effective in terms of this fact. In addition, since the helium gas separated from the raw natural gas is returned to the underground near the gas field by injection of the helium gas to the storage formation, it is not required to construct a new extra storage facility.

In the production system for natural gas according to the embodiment of the invention, a separation membrane included in the separation membrane unit may be made of an inorganic porous material having multiple fine pores.

According to this system, it is possible to efficiently realize the separation of the helium gas using a simple configuration.

In the production system for natural gas according to the embodiment of the invention, the fine pores in the separation membrane may have a diameter in a range of 0.26 nm to less than 0.43 nm.

According to this system, the diameter of the fine pores in the separation membrane is set to a size of 0.26 nm or more that is the molecular kinetic diameter of a helium molecule, that is, a diameter obtained in consideration of the molecular motion. Therefore, when the raw natural gas is supplied to one surface side of the separation membrane, helium molecules contained in the raw natural gas pass through the fine pores in the separation membrane, and move toward the other surface side of the separation membrane. Then, it is possible to separate the helium gas from the raw natural gas. In addition, the diameter of the fine pores in the separation membrane is set to a size of less than 0.43 nm. Then, among substances other than the helium gas contained in the raw natural gas, side-chain hydrocarbons such as propane and aromatic hydrocarbons such as toluene are not capable of passing through the fine pores and being separated, and therefore it is possible to maintain the separation efficiency of the separation membrane at a high level.

Effects of the Invention

According to the production method and production system for natural gas, it is possible to produce a natural gas product without investing considerable effort and costs in the treatment of helium gas that is secondarily obtained in the process of producing the natural gas product.

DESCRIPTION OF EMBODIMENTS

First Embodiment

Figure 1:
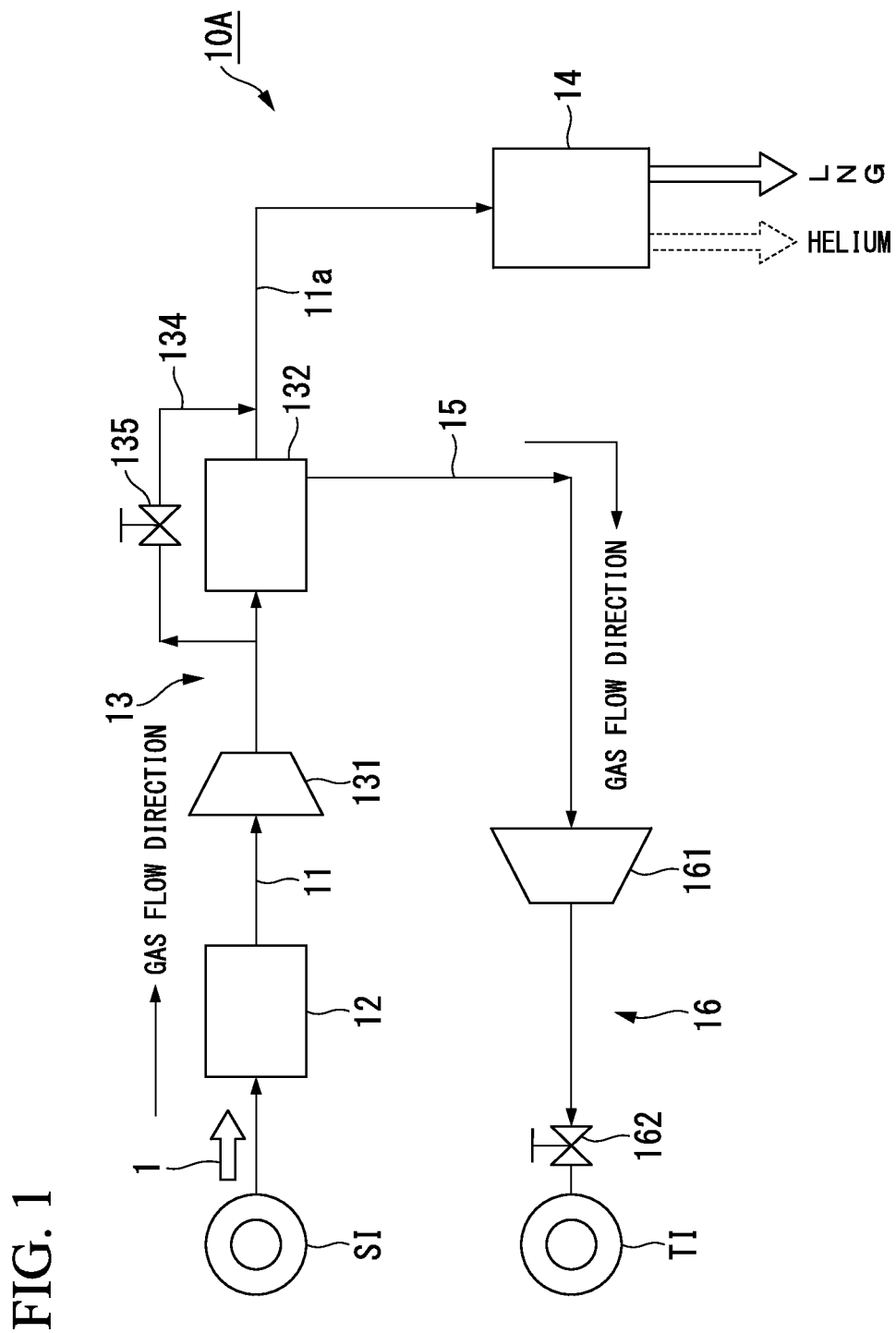
FIG. 1 is a schematic view showing the schematic configuration of a production system for natural gas according to a first embodiment of the invention.

Hereinafter, a method and a production system for natural gas according to an embodiment of the invention will be described respectively with reference to the accompanying drawings. First, a production system that is used in a production method for natural gas according to a first embodiment of the invention will be described. FIG. 1 is a schematic view showing the schematic configuration of a production system for natural gas 10A according to the first embodiment.

As shown in FIG. 1, the production system for natural gas 10A includes a natural gas pipe 11, an impurity removal facility 12, a helium gas separation facility 13, a helium gas pipe 15, and an underground storage facility 16.

The natural gas pipe 11 extends from a production well SI at which a raw natural gas is mined to the helium gas separation facility 13. The impurity removal facility 12 is provided on the natural gas pipe 11. The helium gas separation facility 13 is connected to a natural gas liquefaction plant (hereinafter, LNG production plant) 14 in a remote place through a pipe line 11a for natural gas transportation. The helium gas pipe 15 extends from the helium gas separation facility 13 to an injection well TI. The underground storage facility 16 is provided on the helium gas pipe 15. Meanwhile, the term "terminal" used in the present specification refers to a facility provided at the rear end section of the pipe line 11a for a variety of purposes, and the LNG production plant 14 is an example thereof.

The impurity removal facility 12 is used to remove oil, hydrocarbons of condensates and the like, and impurities such as water from the raw natural gas 1 obtained by mining the production well SI. As shown in FIG. 1, the impurity removal facility 12 is provided at a location on the downstream side of the production well SI in the gas flow direction in the natural gas pipe 11.

The helium gas separation facility 13 includes a compressor for adiabatic compression 131 (second compressor), a separation membrane unit 132, a bypass pipe 134, and a flow control valve 135.

The compressor for adiabatic compression 131 is used to increase the temperature and pressure of the raw natural gas 1 by adiabatically compressing the raw natural gas 1. It is known that, generally, a high temperature or a high pressure is advantageous when a substance having a relatively small molecular size such as helium is separated from a substance having a large molecular size such as methane that is a main component of natural gas using a membrane. Therefore, when the temperature and pressure are increased by adiabatically compressing the raw natural gas using the compressor for adiabatic compression 131, it is possible to improve the efficiency of separating the helium gas from the raw natural gas 1 in the separation membrane unit 132.

Specifically, the raw natural gas 1 is adiabatically-compressed using the compressor for adiabatic compression 131 so that the pressure of the raw natural gas 1 is greater than 0.1 MPa and less than 12 MPa. As described above, since the pressure of the adiabatically-compressed raw natural gas 1 is greater than 0.1 MPa that is the atmospheric pressure, it is possible to prevent the permeation of the helium gas through a separation membrane 132M from becoming difficult due to the partial pressure of the helium gas becoming too low. In addition, since the pressure of the adiabatically-compressed raw natural gas 1 is less than 12 MPa, it is possible to maintain the separation capability of the separation membrane 132M at a high level. That is, in a case in which the pressure of the raw natural gas 1 is greater than 12 MPa, it becomes necessary to increase the mechanical strength by increasing the wall-thickness of the separation membrane 132M to withstand the pressure difference on both sides of the separation membrane 132M. However, an increase in the wall-thickness of the separation membrane 132M, accordingly, decreases the permeate rate or permeation amount of the helium gas, and thus the separation capability of the separation membrane 132M degrades. In addition, since the generally acceptable maximum pressure in the pipe line 11a is in a range of 10 MPa to 12 MPa, there is no case in which the pressure of the raw natural gas 1 exceeds 12 MPa. Meanwhile, to enable the reliable separation by ensuring the partial pressure of the helium gas, it is preferable to adiabatically compress the raw natural gas so that the pressure of the raw natural gas 1 is greater than 1.0 MPa, and it is more preferable to adiabatically compress the raw natural gas so that the pressure of the raw natural gas 1 is greater than 3.5 MPa. This is because, when the pressure of the raw natural gas 1 is greater than 1.0 MPa, the permeation amount of the helium gas through the separation membrane 132M increases, and conversely, the permeation amount of methane gas decreases, and when the pressure of the raw natural gas 1 is greater than 3.5 MPa, most of the helium gas permeates the separation membrane 132M, and little of the methane gas permeates the separation membrane 132M.

In addition, the raw natural gas 1 is adiabatically-compressed using the compressor for adiabatic compression 131 so that the temperature of the raw natural gas reaches a predetermined temperature that does not exceed 450° C. Then, it is possible to maintain the separation capability of the separation membrane 132M at a high level. This is because, when the temperature of the raw natural gas 1 exceeds 450° C., methane, nitrogen, carbon dioxide, and the like which are components other than helium are activated and diffused, the permeate rate or permeation amount of these substances increases, and thus the helium gas separation efficiency decreases. In addition, when the temperature of the raw natural gas 1 exceeds 500° C., since a facility such as the pipe line 11a becomes easily corroded due to the carburization of heavy hydrocarbon which is a component of the raw natural gas, and therefore the raw natural gas 1 does not become hotter than 500° C., it is possible to extend the service life of the facility such as the pipe line 11a. Meanwhile, to enable the reliable separation of the helium gas, it is preferable to adiabatically compress the raw natural gas so that the temperature of the raw natural gas 1 is greater than 70° C., and it is more preferable to adiabatically compress the raw natural gas so that the temperature of the raw natural gas 1 is greater than 100° C. When the temperature of the raw natural gas 1 is greater than 70° C., the influence of hydrocarbons that are equal to or greater than ethane contained in the raw natural gas on the separation of the helium gas becomes small, and when the temperature of the raw natural gas 1 is greater than 100° C., the influence of water and liquid phase hydrocarbons that are contained in the raw natural gas on the separation of the helium gas becomes small, and thus there is an advantage of a capability of maintaining the helium gas separation efficiency at a high level.

As shown in FIG. 1, the compressor for adiabatic compression 131 is provided at a location on the downstream side of the impurity removal facility 12 in the natural gas pipe 11. The compressor for adiabatic compression 131 may be used as a power source for transporting the natural gas to the LNG production plant 14 which is carried out through the pipe line 11a. In this case, for example, when the pressure of natural gas at 50° C. is increased at a compression ratio of three, the temperature of the natural gas at an outlet of the compressor for adiabatic compression 131 is 160° C. When the compression heat is actively used for the membrane separation in the separation membrane unit 132, it is possible to decrease the consumption amount of energy regarding a membrane separation action, and consequently, to decrease the costs.

Figure 2:
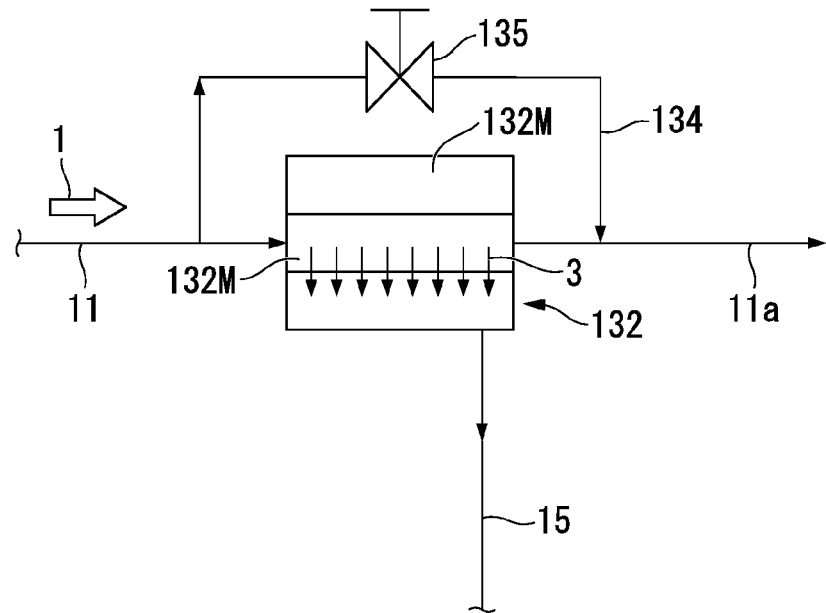
FIG. 2 is a partial enlarged view showing an enlarged periphery of a separation membrane unit in FIG. 1.

The separation membrane unit 132 is used to separate the helium gas from the raw natural gas 1 that has passed through the impurity removal facility 12. FIG. 2 is a partial enlarged view showing an enlarged periphery of the separation membrane unit 132 in FIG. 1. The separation membrane unit 132 includes the separation membrane 132M. The material of the separation membrane 132M is an inorganic porous material and an example thereof is a silicon compound-based material particularly having a characteristic of allowing a large permeation amount or permeate rate of the helium gas. When the raw natural gas 1 flows in the separation membrane unit 132, the helium gas contained in the raw natural gas 1 permeates the separation membrane 132M, and flows into the helium gas pipe 15 as shown in FIG. 2. The separation membrane unit 132 configured as described above is provided at a location on the downstream side of the compressor for adiabatic compression 131 in the natural gas pipe 11 as shown in FIG. 1.

Figure 6:
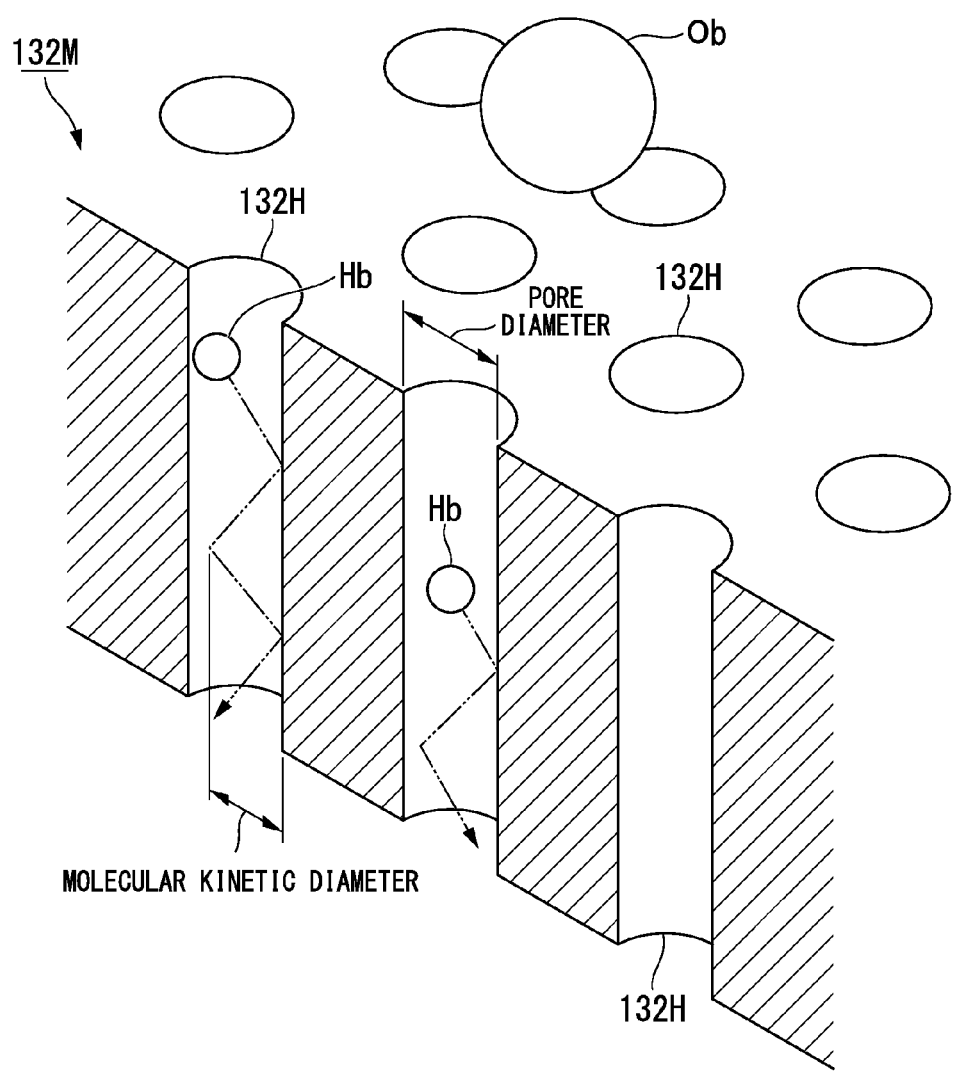
FIG. 6 is a partial enlarged view showing an enlarged part of a separation membrane.

FIG. 6 is a partial enlarged view showing an enlarged part of the separation membrane 132M. A plurality of fine pores 132H is formed in the separation membrane 132M so as to permeate the separation membrane in the thickness direction thereof. The pore diameter (diameter) of the fine pores 132H is set to be approximately 0.26 nm or more and smaller than 0.43 nm. As described above, since the pore diameter of the fine pores 132H is set to a size of 0.26 nm or more that is the molecular kinetic diameter of a helium molecule Hb, that is, a diameter obtained in consideration of the molecular motion, helium molecules Hb are capable of permeating the fine pores 132H, and moving from one surface side to the multiple surface side of the separation membrane. Table 1 describes main substances contained in the raw natural gas and the molecular kinetic diameters thereof

TABLE 1

| Substances | Molecular kinetic diameter (nm) |
|---|---|
| He (helium) | 0.260 |
| $CO_2$ (carbon dioxide) | 0.330 |
| $N_2$ (nitrogen) | 0.364 |
| $CH_4$ (methane) | 0.380 |
| $C_2H_6$ (ethane) | 0.400 |
| $C_3H_8$ (propane) | 0.430 |
| $n\text{-}C_4H_{10}$ (n-butane) | 0.430 |
| $i\text{-}C_4H_{10}$ (i-butane) | 0.500 |
| $C_6H_5CH_3$ (toluene) | 0.610 |

Since the pore diameter of the fine pores 132H is set to be less than 0.43 nm, among molecules Ob other than the helium gas contained in the raw natural gas, substances having a molecular kinetic diameter of 0.43 nm or more (low hydrocarbons such as propane and n-butane in Table 1) are not easily separated through the fine pores 132H. Therefore, it is possible to separate the helium gas from the raw natural gas at high separation efficiency. To further increase the helium gas separation efficiency of the separation membrane 132M, the pore diameter of the fine pores 132H is preferably set to less than 0.40 mm. This is because, when the pore diameter is set to less than 0.40 nm, in addition to the above-described propane and n-butane, ethane (having a molecular kinetic diameter of 0.400 nm) described in Table 1 is not easily separated through the fine pores 132H. The pore diameter of the fine pores 132H is more preferably set to less than 0.38 mm. This is because, when the pore diameter is set to less than 0.38 nm, in addition to the above-described substances, methane (having a molecular kinetic diameter of 0.380 nm) described in Table 1 is not easily separated through the fine pores 132H.

The number, material, shape, and the like of the separation membrane 132M configuring the separation membrane unit 132 are not limited to the embodiment, and can be appropriately designed and changed. For example, the separation membrane 132M may has a shape like a hollow fiber film or may be a flat film having a thin plate shape. In addition, the material of the separation membrane 132M may be an organic macromolecular substance having a characteristic of allowing a large penetration amount or penetration rate of the helium gas. However, the separation membrane made of an inorganic porous material as in the embodiment is capable of withstanding the raw natural gas 1 with a higher temperature, and thus there is an advantage of a capability of increasing the helium gas separation efficiency.

The bypass pipe 134 is used to send the natural gas to the pipe line 11a on the downstream side bypassing the separation membrane unit 132. The bypass pipe 134 is connected with the natural gas pipe 11 on a upstream-side location and a downstream-side location of the separation membrane unit 132 as shown in FIG. 1.

The flow control valve 135 is used to adjust the flow rate of the natural gas flowing in the bypass pipe 134. That is, when the amount of the helium gas in the natural gas that has passed through the impurity removal facility 12 is small, and the separation of the helium gas from the natural gas is not necessarily required, the natural gas may be made to flow to the pipe line 11a on the downstream side bypassing the separation membrane unit 132 by opening the flow control valve 135.

In addition, the flow rate of the natural gas flowing in the bypass pipe 134 may be adjusted, and the amount of the raw natural gas 1 passing through the separation membrane unit 132 may be adjusted. For example, when it is not necessary to fully open the flow control valve 135 as described above, and the amount of helium is decreased more than necessary when all the natural gas that has passed through the impurity removal facility 12 is made to flow through the separation membrane unit 132, the flow control valve 135 is partially opened, and the amount of the raw natural gas 1 passing through the separation membrane unit 132 is thereby decreased. Then, it is possible to suppress the wasteful energy consumption regarding the membrane separation by decreasing the burden of the separation membrane unit 132.

When the helium gas is produced as a product for the purpose of the supply of the helium gas to the market, the raw natural gas containing the helium gas may be conveyed to the LNG production plant 14 through the pipe line 11a by opening the flow control valve 135. In the LNG production plant 14, it is possible to produce a helium gas product by employing a known separation method such as the cryogenic distillation process, the adsorption/absorption process, or the membrane separation process.

In the LNG production plant 14, LNG is produced as a natural gas product from the natural gas treated using the impurity removal facility 12 or the helium gas separation facility 13.

The underground storage facility 16 is used to press the helium gas 3 flowing through the helium gas pipe 15 into the injection well TI. The underground storage facility 16 includes a compressor 161 (first compressor) and an on-off valve 162 as shown in FIG. 1. Meanwhile, in actual cases, the helium gas 3 refers to a gas mixture containing more helium than the raw natural gas.

The compressor 161 is used to compress the helium gas 3. The compressor 161 is provided at a predetermined location in the helium gas pipe 15 as shown in FIG. 1.

The on-off valve 162 is used to switch the injection of the helium gas 3 to the injection well TI and the producing of the raw natural gas containing helium injected to the ground from the injection well TI. The on-off valve 162 is provided at a location on the downstream side of the compressor 161 in the gas flow direction in the helium gas pipe 15 as shown in FIG. 1.

Figure 3:
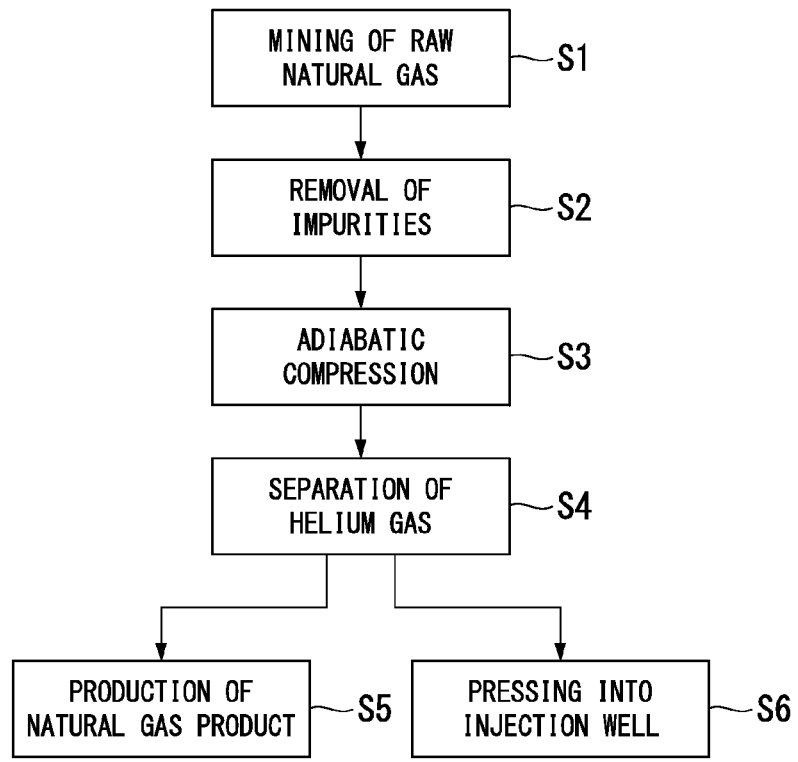
FIG. 3 is a flow chart showing steps in a production method for natural gas according to a first embodiment of the invention.

Next, a production method for natural gas using the production system for natural gas 10A according to the first embodiment of the invention will be described. FIG. 3 is a flow chart showing steps in the production method for natural gas according to the embodiment of the invention. In the following description, individual steps will be sequentially described; however, in an actual plant, it is preferable to carry out the individual steps in parallel and continuously produce a natural gas product.

First, the raw natural gas 1 is obtained by drilling the production well SI shown in FIG. 1 (Step S1).

Next, the raw natural gas 1 is passed through the impurity removal facility 12 shown in FIG. 1, thereby oil, hydrocarbons of condensates and the like, and impurities such as water being removed from the raw natural gas 1 (Step S2).

Next, the raw natural gas 1 is adiabatically-compressed in the compressor for adiabatic compression 131 shown in FIG. 1 (Step S3). In addition, the adiabatically-compressed raw natural gas 1 is passed through the separation membrane unit 132 shown in FIG. 1, thereby the helium gas 3 from the raw natural gas 1 (Step S4). At this time, since the temperature and pressure of the raw natural gas 1 are increased due to the adiabatic compression, it is possible to efficiently separate the helium gas 3 using the separation membrane.

The natural gas treated using the impurity removal facility 12 and the helium gas separation facility 13 is conveyed to the LNG production plant 14 through the pipe line 11a. In the LNG production plant 14, LNG is produced as a natural gas product (Step S5).

In addition, the helium gas 3 separated using the separation membrane unit 132 is pressed into the injection well TI using the underground storage facility 16 shown in FIG. 1 (Step S6). That is, the helium gas 3 flowing through the helium gas pipe 15 is compressed using the compressor 161, and is pressed into the injection well TI through the on-off valve 162. The helium gas pressed into the injection well TI is returned to an underground storage formation. The on-off valve 162 is closed when it is not necessary to return the helium gas to the underground; however, it is possible to produce a raw natural gas containing higher concentration of helium from the injection well TI while opening the on-off valve 162 depending on necessity.

According to the above-described production method for natural gas, it is possible to reserve the helium gas 3 that is secondarily obtained in the process of producing a natural gas product at a low cost by returning the helium gas to the underground through the injection well TI. Therefore, even in a case in which there is a regulation regarding the treatment of the helium gas, it is possible to produce natural gas product at a low price.

In the embodiment, the injection well TI is provided separately from the production well SI, but the configuration is not limited thereto, and the production well SI may also be used as the injection well TI, and the helium gas separated from the raw natural gas may be returned to the production well SI.

Second Embodiment

Hereinafter, a production system for natural gas 10B according to a second embodiment will be described. When the production system for natural gas 10B according to the present embodiment is compared with the first embodiment, the difference is that the production system for natural gas includes a sweeping gas introduction unit 133. Except for the above-described fact, the configuration is the same as in the first embodiment, and thus the same reference signs as in the first embodiment will be used, and the same configuration will not be described.

Figure 4:
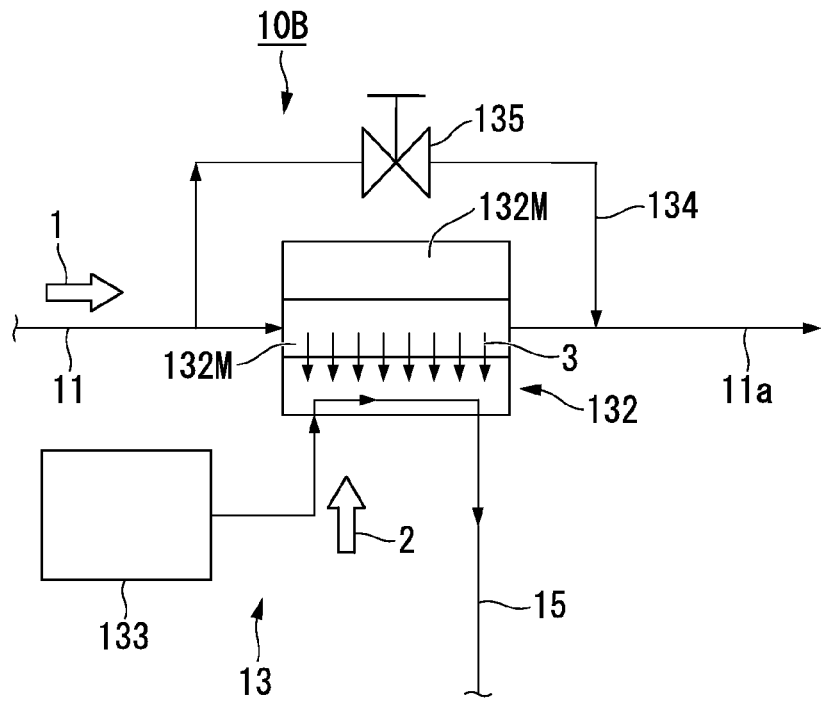
FIG. 4 is a partial enlarged view showing an enlarged periphery of a separation membrane unit in a production system for natural gas according to a second embodiment.

FIG. 4 is a partial enlarged view showing an enlarged periphery of the separation membrane unit 132 in the production system for natural gas 10B according to the embodiment. The helium gas separation facility 13 in the embodiment further includes the sweeping gas introduction unit 133. The sweeping gas introduction unit 133 is used to introduce sweeping gas into the separation membrane unit 132.

The sweeping gas introduction unit 133 is provided at a location close to the separation membrane unit 132 as shown in FIG. 4, and introduces sweeping gas 2 into the separation membrane unit 132. When the sweeping gas is introduced, the partial pressure of helium on the permeate side in the separation membrane unit 132 decreases. In addition, the flow of the sweeping gas sweeps out helium in the separation membrane unit 132. Then, the helium separation efficiency of the separation membrane unit 132 improves. Furthermore, since the separation membrane unit 132 is connected with a low-pressure side of the compressor 161 through the helium gas pipe 15, when the compressor 161 is driven, the inside pressure of the separation membrane unit 132 is decreased, and the inside of the separation membrane unit 132 is effectively swept.

When gas introduced into the separation membrane unit 132 is swept from the separation membrane unit 132, the helium gas separated from the raw natural gas 1 is swept from the separation membrane unit 132 together with the gas introduced into the separation membrane unit 132, and is no longer remained in the separation membrane unit 132, and therefore the helium gas separation of the separation membrane unit 132 improves. Therefore, it is possible to produce a natural gas product by efficiently separate helium gas from the raw natural gas 1. Meanwhile, as the sweeping gas 2, gas having an arbitrary composition may be used. In addition, in the embodiment, the compressor 161 is used as the driving source for the sweeping gas 2; however, separately from the compressor 161, a driving source for the sweeping gas 2 may be provided.

Third Embodiment

Hereinafter, a production system for natural gas 10C according to a third embodiment will be described. When the production system for natural gas 10C according to the present embodiment is compared with the second embodiment, the only difference is the configuration of a sweeping gas introduction unit configuring the helium gas separation facility 13. Except for the above-described fact, the configuration is the same as in the first embodiment, and thus the same reference signs as in the first embodiment will be used, and the same configuration will not be described.

Figure 5:
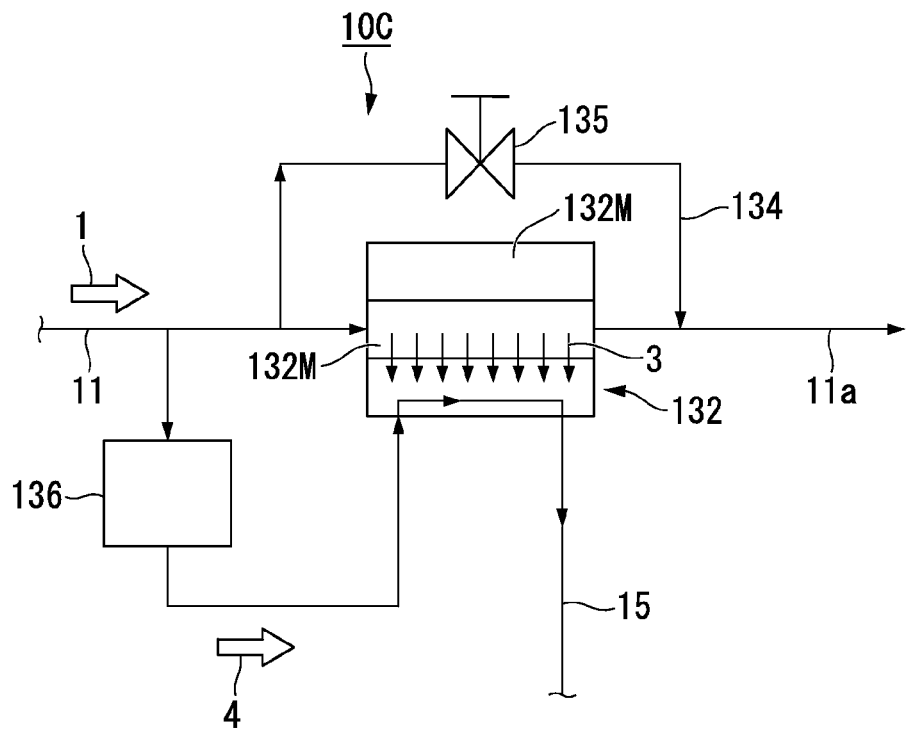
FIG. 5 is a partial enlarged view showing an enlarged periphery of a separation membrane unit in a production system for natural gas according to a third embodiment.

FIG. 5 is a partial enlarged view showing an enlarged periphery of the separation membrane unit 132 in the production system for natural gas 10C according to the embodiment.

In the sweeping gas introduction unit 136 (natural gas introduction unit) of the embodiment, a part of the raw natural gas 1 is used as sweeping gas 4 for sweeping the separation membrane unit 132. Then, since it is not necessary to supply another gas separately from the raw natural gas 1 to sweep the separation membrane unit 132, it is possible to decrease the costs and simplify the system. The actions and effects of the sweeping gas 4 are the same as in the second embodiment, and thus will not be described herein.

Fourth Embodiment

Figure 7:
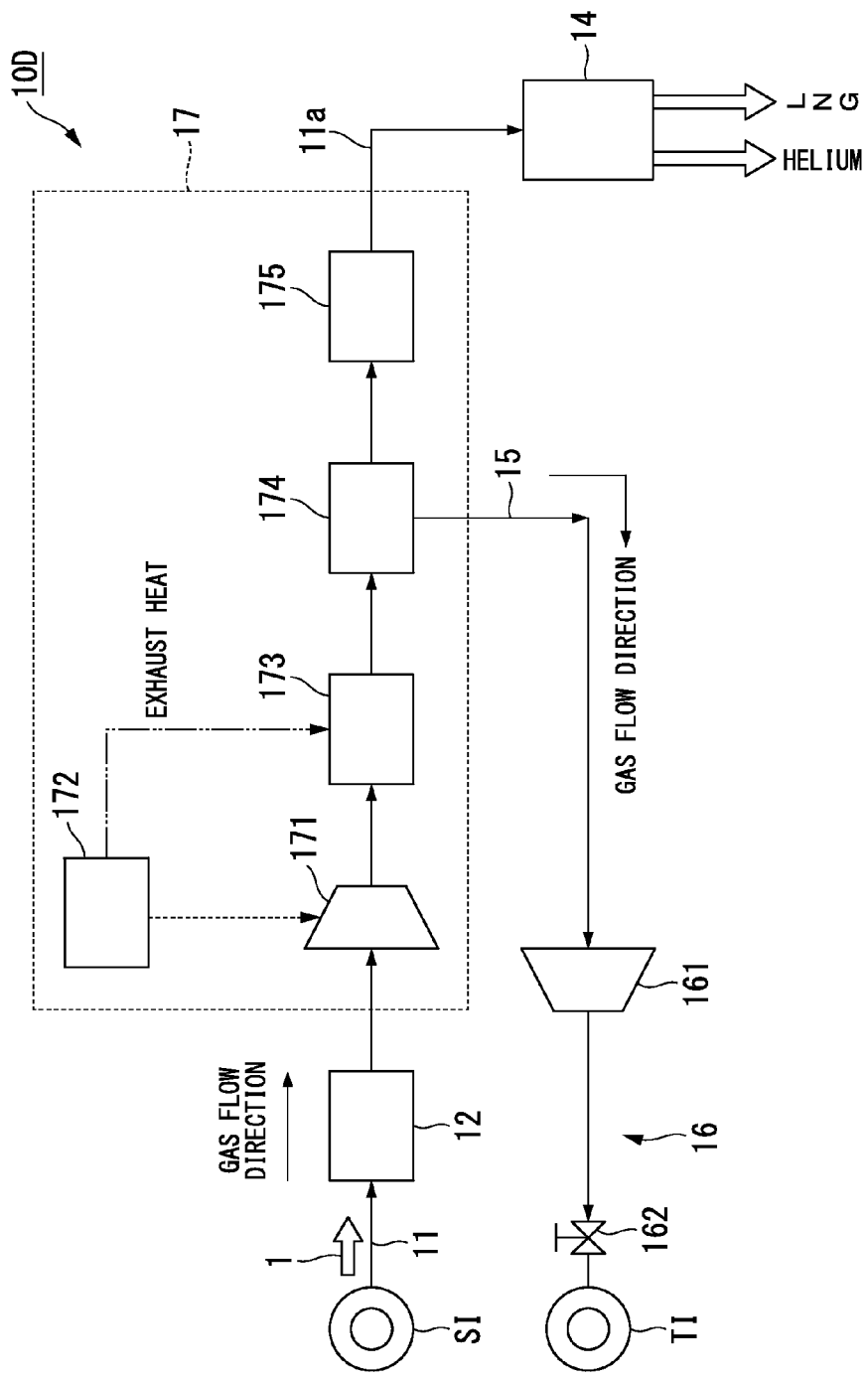
FIG. 7 is a schematic view showing the schematic configuration of a production system for natural gas according to a fourth embodiment of the invention.

Next, a production system used for the production method for natural gas according to a fourth embodiment of the invention will be described. FIG. 7 is a schematic view showing the schematic configuration of a production system for natural gas 10D according to the fourth embodiment of the invention.

As shown in FIG. 7, the production system for natural gas 10D includes the natural gas pipe 11, the impurity removal facility 12, the helium gas separation facility 17, the helium gas pipe 15, and the underground storage facility 16. When the production system for natural gas 10D according to the embodiment is compared with the production system for natural gas 10A according to the first embodiment, the only difference is the configuration of a helium gas separation facility 17. Except for the above-described fact, the configuration is the same as in the first embodiment, and thus the same reference signs as in the first embodiment will be used, and the same configuration will not be described.

As shown in FIG. 7, the helium gas separation facility 17 includes a compressor for adiabatic compression 171, a gas turbine 172 (incidental facility), a heat exchanger 173, a separation membrane unit 174, and a cooling tower 175.

The compressor for adiabatic compression 171 is used to increase the temperature and pressure of the raw natural gas 1 by adiabatically compressing the raw natural gas. The compressor for adiabatic compression 171, similar to the compressor for adiabatic compression 131 in the first embodiment, adiabatically compresses the raw natural gas 1 so that the pressure of the raw natural gas 1 is greater than 0.1 MPa and less than 12 MPa. In addition, to enable the reliable separation by increasing the partial pressure of the helium gas, it is preferable to adiabatically compress the raw natural gas so that the pressure of the raw natural gas 1 is greater than 0.5 MPa, and it is more preferable to adiabatically compress the raw natural gas so that the pressure of the raw natural gas 1 is greater than 1.0 MPa. In addition, the compressor for adiabatic compression 171, similar to the compressor for adiabatic compression 131 in the first embodiment, adiabatically compresses the raw natural gas 1 so that the temperature of the raw natural gas is a predetermined temperature that does not exceed 450° C.

The gas turbine 172 is used as a driver for the compressor for adiabatic compression 171. As shown in FIG. 7, the gas turbine 172 is directly connected with the compressor for adiabatic compression 171 so as to drive the compressor for adiabatic compression, and also supplies exhaust heat generated during the driving to the heat exchanger 173. The gas turbine 172 is an example of the "incidental facility" according to the embodiment, and as the incidental facility, it is also possible to use, for example, another driver for a power generation facility configured to supply power to a variety of facilities incidental to the production system for natural gas 10D.

The heat exchanger 173 is used to transfer the exhaust heat from the gas turbine 172 to the raw natural gas 1. As shown in FIG. 7, the heat exchanger 173 is provided at a location on the downstream side of the compressor for adiabatic compression 171 in the natural gas pipe 11. The heat exchanger 173 further heats the raw natural gas 1 heated through the adiabatic compression using the compressor for adiabatic compression 171. Then, it is possible to heat the raw natural gas 1 heated to a temperature that does not exceed 450° C. using the compressor for adiabatic compression 171 to a predetermined temperature that does not exceed 500° C. through heating by the heat exchanger 173. Then, as described in the first embodiment, it is possible to maintain the separation capability of the separation membrane 132M at a high level, and to make facilities such as the pipe line more resistant against corrosion. In addition, even in a case in which it is not possible to sufficiently heat the raw natural gas 1 only with the compressor for adiabatic compression 171, it is possible to heat the raw natural gas to a high temperature range using the exhaust heat from the gas turbine 172, and therefore it is possible to adjust the separation amount of the helium gas in a wider range. Meanwhile, to enable the more reliable separation of the helium gas, it is preferable to heat the raw natural gas using the heat exchanger 173 so that the temperature of the raw natural gas 1 is greater than 70° C., and it is more preferable to heat the raw natural gas so that the temperature of the raw natural gas 1 is greater than 100° C. When the temperature of the raw natural gas 1 is greater than 70° C., the influence of hydrocarbons that are equal to or greater than ethane contained in the raw natural gas on the separation of the helium gas becomes small, and when the temperature of the raw natural gas 1 is greater than 100° C., the influence of water and liquid phase hydrocarbons that are contained in the raw natural gas on the separation of the helium gas becomes small, and thus there is an advantage of a capability of maintaining the helium gas separation efficiency at a high level.

As described above, according to the production system for natural gas 10B of the embodiment, the raw natural gas 1 is heated using both the compressor for adiabatic compression 171 and the heat exchanger 173, and therefore, compared with a case in which the raw natural gas 1 is heated using only the compressor for adiabatic compression 171 as in the first embodiment, it is possible to increase the energy efficiency throughout the entire system by effectively using the exhaust heat from the gas turbine.

The separation membrane unit 174 is used to separate the helium gas from the raw natural gas 1. As shown in FIG. 7, the separation membrane unit 174 is provided at a location on the downstream side of the heat exchanger 173 in the natural gas pipe 11. While not shown in detail, the separation membrane unit 174 of the embodiment also includes a separation membrane. The separation membrane is the same as the separation membrane 132M included in the separation membrane unit 132 of the first embodiment, and thus, in FIG. 7, the same reference signs as in FIG. 1 will be attached, and the same configuration will not be described.

The cooling tower 175 is used to cool the raw natural gas 1 by heat exchanging with the atmosphere. As shown in FIG. 7, the cooling tower 175 is provided at a location on the downstream side of the separation membrane unit 174 in the pipe line 11a. The cooling tower 175 enables the temperature of the raw natural gas 1 heated using the compressor for adiabatic compression 171 and the heat exchanger 173 to be decreased to a predetermined standard temperature for the pipe line 11a.

INDUSTRIAL APPLICABILITY

The invention relates to a production method for natural gas including a step of adiabatically compressing a raw natural gas containing helium gas, a step of separating the helium gas from the raw natural gas by passing the adiabatically-compressed raw natural gas through a separation membrane unit, a step of conveying the raw natural gas from which the helium gas has been separated to a terminal through a pipe line, and a step of pressing the helium gas separated from the raw natural gas into an underground storage formation.

According to the invention, it is possible to produce a natural gas product without investing considerable effort and costs in the treatment of helium gas that is secondarily obtained in the process of producing the natural gas product.

REFERENCE SIGNS LIST

1 RAW NATURAL GAS
3 HELIUM GAS
11a PIPE LINE
131, 171 COMPRESSOR FOR ADIABATIC COMPRESSION
132, 174 SEPARATION MEMBRANE UNIT
132M SEPARATION MEMBRANE
133 SWEEPING GAS INTRODUCTION UNIT (NATURAL GAS INTRODUCTION UNIT)
14 LIQUEFIED NATURAL GAS PRODUCTION PLANT (TERMINAL)
161 COMPRESSOR

The invention claimed is:

1. A production method for natural gas comprising:
a step of adiabatically compressing a raw natural gas containing helium gas;
a step of separating the helium gas from the raw natural gas by passing the adiabatically-compressed raw natural gas through a separation membrane unit;
a step of conveying the raw natural gas from which the helium gas has been separated to a terminal through a pipe line;
a step of pressing the helium gas separated from the raw natural gas by the separation membrane unit into an underground storage formation; and
a step of flowing the adiabatically-compressed raw natural gas to a bypass pipe which is connected to the pipe line so as to bypass the separation membrane unit,
wherein the amount of the raw natural gas passing through the separation membrane unit is adjusted by adjusting the flow rate of the raw natural gas flowing in the bypass pipe based on the amount of the helium gas in the raw natural gas.

2. The production method for natural gas according to claim 1,
wherein a separation membrane included in the separation membrane unit is made of an inorganic porous material having multiple fine pores.

3. The production method for natural gas according to claim 2,
wherein the fine pores in the separation membrane have a diameter of 0.26 nm or more to less than 0.43 nm.

4. The production method for natural gas according to claim 1,
wherein the step of adiabatically compressing the raw natural gas is carried out using a compressor, and the compressor sends, using pressure, the raw natural gas through a pipe line extending from the separation membrane unit toward a downstream side of the pipe line.

5. The production method for natural gas according to claim 1,
wherein a pressure of the raw natural gas supplied to the separation membrane unit is greater than 0.1 MPa and less than 12 MPa.

6. The production method for natural gas according to claim 1,
wherein the separation amount of the helium gas is controlled by adjusting the temperature of the raw natural gas supplied to the separation membrane unit.

7. The production method for natural gas according to claim 1,
wherein exhaust heat from an incidental facility is used to heat the raw natural gas supplied to the separation membrane unit.

8. The production method for natural gas according to claim 7,
wherein the incidental facility is a gas turbine configured to drive the compressor.

9. The production method for natural gas according to claim 1,
wherein a temperature of the raw natural gas supplied to the separation membrane is less than 450° C.

10. The production method for natural gas according to claim 1, further comprising:
a step of sweeping the separation membrane unit by introducing gas.

11. The production method for natural gas according to claim 10,
wherein the separation membrane unit is swept by introducing a part of the raw natural gas.

12. A production system for natural gas comprising:
a compressor configured to adiabatically compress a raw natural gas containing helium gas;
a separation membrane unit configured to separate the helium gas from the adiabatically-compressed raw natural gas;
a pipe line configured to convey the raw natural gas from which the helium gas has been separated toward a terminal;
an underground storage facility configured to press the separated helium gas from the raw natural gas by the separation membrane unit into an underground storage formation;
a bypass pipe configured to connect to the pipe line so as to bypass the separation membrane unit, and to flow the adiabatically-compressed raw natural gas to the pipe line; and
a flow control valve configured to adjust the flow rate of the raw natural gas flowing in the bypass pipe based on the amount of the helium gas in the raw natural gas,
wherein the amount of the raw natural gas passing through the separation membrane unit is adjusted by adjusting the flow rate of the raw natural gas flowing in the bypass pipe by use of the flow control valve.

13. The production system for natural gas according to claim 12,
wherein a separation membrane included in the separation membrane unit is made of an inorganic porous material having multiple fine pores.

14. The production system for natural gas according to claim 13,
wherein the fine pores in the separation membrane have a diameter of 0.26 nm or more to less than 0.43 nm.

* * * * *